(12) United States Patent
Henson

(10) Patent No.: US 7,380,751 B1
(45) Date of Patent: Jun. 3, 2008

(54) JETAIR RECOVERY GENERATOR

(76) Inventor: George A Henson, 328 Rockledge Ln, Manitou Springs, CO (US) 80829

( * ) Notice: Subject to any disclaimer, the term of this patent is extended or adjusted under 35 U.S.C. 154(b) by 476 days.

(21) Appl. No.: 11/161,115

(22) Filed: Jul. 22, 2005

(51) Int. Cl.
    *B64G 11/00* (2006.01)
(52) U.S. Cl. .................. 244/114 B; 244/1 R
(58) Field of Classification Search ............ 244/114 B, 244/1 R
    See application file for complete search history.

(56) References Cited

U.S. PATENT DOCUMENTS

| | | | | |
|---|---|---|---|---|
| 2,783,003 A | * | 2/1957 | Ralston et al. ............... | 244/54 |
| 2,936,846 A | * | 5/1960 | Tyler et al. ................. | 181/217 |
| 3,141,639 A | * | 7/1964 | Klein ..................... | 244/114 B |
| 3,273,654 A | * | 9/1966 | Pinnes ..................... | 416/142 |
| 3,811,791 A | * | 5/1974 | Cotton ..................... | 416/129 |
| 4,251,040 A | * | 2/1981 | Loyd ....................... | 244/154 |
| 6,652,221 B1 | * | 11/2003 | Praenkel ................... | 415/3.1 |

* cited by examiner

*Primary Examiner*—Tien Dinh
(74) *Attorney, Agent, or Firm*—G.F. Gallinger

(57) ABSTRACT

A method of generating energy from a discharge of an aircraft comprising the steps of: a) providing an air recovery generator assembly having a bladed wheel; and, b) positioning the air recovery generator behind the aircraft. The discharged air from the aircraft then turns the wheel thereby generating energy. In a preferred aspect of this invention the bladed wheel comprises a bladed cylinder wheel and the bladed cylindrical wheel additionally rotates a flywheel to store rotational energy therein. A mechanism is provided to move the bladed cylindrical wheel from a below ground storage position to an elevated operational position.

13 Claims, 1 Drawing Sheet

JETAIR RECOVERY GENERATOR

FIELD OF THE INVENTION

This invention relates to energy recovery from wind. More particularly this invention relates to an apparatus and method for recovering energy from discharged engine air when jets takeoff at an airport.

BACKGROUND OF THE INVENTION

Commercial jets cruise at air speeds exceeding 500 mph. At takeoff air discharged from their engines has speeds exceeding 300 mph. The speed of this discharged air is greatest immediately behind the engines. At one end of the runway prior to take off pilots usually accelerate their engines to full power with their wheel brakes engaged in order to achieve maximum air speed at the other end of the runway in order to lift off. This engine accelerating position for take off is generally the same for all planes taking off. Immediately behind this accelerating position on the runway air is discharged at speeds exceeding 300 mph. This high velocity air exerts tremendous force and contains much inherent power.

OBJECTS OF THE INVENTION

It is an object of this invention to disclose a method and apparatus for capturing energy contained within this discharge air or propwash. It is an object of this invention to disclose a simple apparatus which will generate substantial power from air discharged from aircraft. It is yet a further object of this invention to disclose an apparatus which may be most advantageously and conveniently positioned immediately behind a jet positioned for take off on a runway. It is a final object of this invention to disclose a power generation apparatus which is inconspicuously and conveniently positioned beneath the runway when not in use, and a power generator which automatically elevates to an in use position immediately before an adjacent aircraft accelerates its engines for takeoff.

One aspect of this invention provides for a method of generating energy from a discharge of an aircraft comprising the steps of: a) providing an air recovery generator assembly having a bladed wheel; and, b) positioning the air recovery generator behind the aircraft. The discharged air from the aircraft then turns the wheel thereby generating energy.

In a preferred aspect of this invention the bladed wheel comprises a bladed cylinder wheel and the bladed cylindrical wheel additionally rotates a flywheel to store rotational energy therein.

In another preferred aspect of the invention a mechanism to move the bladed cylindrical wheel from a below ground storage position to an elevated operational position.

Various other objects, advantages and features of this invention will become apparent to those skilled in the art from the following description in conjunction with the accompanying drawings.

FIGURES OF THE INVENTION

Figure 1:
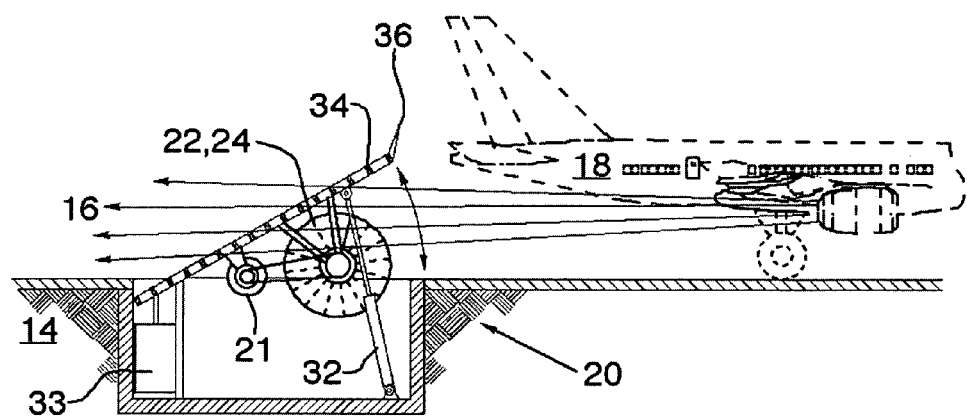

FIG. 1 is an elevational view of jet air recovery generator assembly having a bladed wheel. The generator assembly is positioned behind a jet aircraft.

Figure 2:
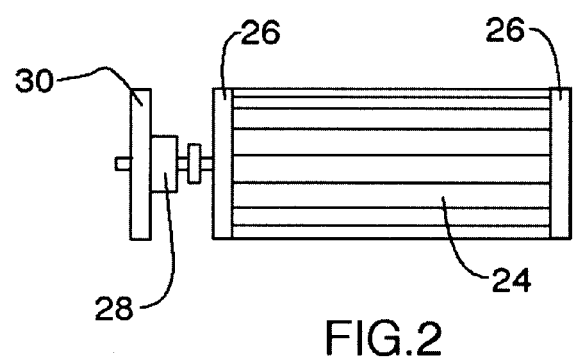

FIG. 2 is a schematic view of the bladed cylindrical wheel shown in FIG. 1. The bladed wheel has integral flywheels. The shaft of the bladed wheel is attached to a governor/clutch assembly which engages a secondary flywheel when required.

Figure 3:
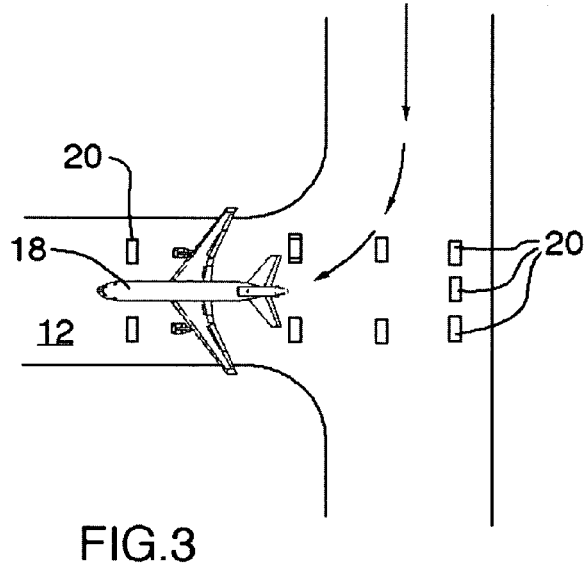

FIG. 3 is a plan view of a runway showing multiple jet air recovery generator assemblies spaced therealong.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have an elevational view of jet air recovery generator assembly 20 having a bladed wheel 22. The generator assembly 20 is positioned behind a jet aircraft 18. A method of generating energy from a discharge of a jet aircraft 18 comprises the steps of: a) providing a jet air recovery generator assembly 20 having a bladed wheel 22; and, b) positioning the jet air recovery generator 20 behind the aircraft 18. Discharged air 16 from the aircraft 18 turns the wheel 22 thereby generating energy. Most preferably the bladed wheel 22 comprises a bladed cylinder 24 and rotates a flywheel 26 to store rotational energy therein.

Within this specification "on the ground" is intended and defined to include any supporting surface used to support or carry a non-airborne aircraft.

FIG. 2 is a perspective view of the bladed cylindrical wheel shown in FIG. 1. The cylindrical bladed wheel 22 additionally rotates a flywheel 26 to store rotational energy therein. In FIG. 2 the cylindrical bladed wheel is shown with an integral flywheel 26. The shaft of the bladed wheel is attached to a governor/clutch assembly 28 which engages a secondary flywheel 30 when required. In a preferred embodiment of the invention a governor/clutch assembly 28 is mechanically attached to a shaft of the bladed wheel 22 and to a secondary flywheel 30 to limit the speed of the cylindrical wheel 24 when required. The governor/clutch assembly 28 engages the secondary flywheel 30 when rpm is excessive.

As shown in FIG. 1, a preferred embodiment of the invention, the bladed cylindrical wheel is most preferably stored and housed below ground. When the cylindrical wheel is stored below ground then the assembly 20 further comprises a mechanism 32 to move the bladed cylindrical wheel 24 from a below ground storage position to an elevated operational position.

Most preferably the mechanism 32 is covered by a grate 34 so that a flat supporting surface is presented above the bladed cylindrical wheel 24 when it is in a retracted position and also so that discharged air 16 can pass through the grate 34 when it is in an elevated position. Most preferably the grate 34 is hinged on a front side portion so that if the grate 34 was inadvertently left open it would close when an aircraft 18 rolled forwardly thereover. In the most preferred embodiment of the invention the bladed cylindrical wheel 24 is carried by a lower front side portion of the grate 34 and the generator 21 and flywheel 26 are carried attached to a lower rear side portion of the grate 34 so that when the grate 34 is lifted the bladed cylindrical wheel 24 is also lifted.

In a preferred embodiment of the invention the bladed cylindrical wheel 24 is carried by a lower front side portion of the grate 34 and the generator 21 and flywheel 26 are carried attached to a lower rear side portion of the grate 34 so that when the grate 34 is lifted the bladed cylindrical wheel 24 is also lifted. The grate 34 is hinged along a rear side portion so that the front side portion of the grate 34 can be swung upwardly lifting the upper side portion of the bladed cylindrical wheel 24 above ground 14 to the elevated operational position. The grate 34 is provided with a remotely controlled lift mechanism 32.

In the most preferred embodiment, the invention further comprises a grate counterweight 33 so that the lift required to elevate the grate 34 to the operational position is minimized. In the most preferred embodiment, the invention also comprises a wind catching blade 36 attached along a front side portion of the grate 34 so that discharged air from the aircraft 18 will automatically elevate the grate 34 to an operational position.

FIG. 3 is a plan view of a runway 12 showing multiple jet air recovery generator assemblies spaced therealong.

While the invention has been described with preferred specific embodiments thereof, it will be understood that this description is intended to illustrate and not to limit the scope of the invention, which is defined by the following claims.

What is claimed is:

1. A method of generating electrical energy on the ground from a discharge of an aircraft comprising the steps of:
   a) providing an air recovery generator assembly having a bladed wheel; and,
   b) positioning the air recovery generator behind the aircraft on the ground;
so that discharged air from the aircraft turns the wheel thereby generates electrical energy on the ground.

2. A method as in claim 1 wherein the bladed wheel comprises a bladed cylinder wheel.

3. A method as in claim 2 wherein the bladed cylindrical wheel additionally rotates a flywheel to store rotational energy therein.

4. A method as in claim 2 further comprising a mechanism to move the bladed cylindrical wheel from a below ground storage position to an elevated operational position.

5. A method as in claim 4 wherein the mechanism is covered by a grate so that a flat supporting surface is presented above the bladed cylindrical wheel when it is in a retracted position and so that discharged air can pass through the grate when it is in an elevated position.

6. A method as in claim 5 wherein the grate is hinged on a rear side portion so that if the grate was inadvertently left open it would close when an aircraft rolled forwardly thereover.

7. A method as in claim 6 wherein the bladed cylindrical wheel is carried by a lower front side portion of the grate and wherein the generator and flywheel are carried attached to a lower rear side portion of the grate so that when the grate is lifted the bladed wheel is also lifted.

8. A method as in claim 7 wherein the grate is hinged along a rear side portion so that the front side portion of the grate can be swung upwardly lifting the upper side portion of the bladed cylindrical wheel above ground to the elevated operational position.

9. A method as in claim 8 wherein the grate is provided with a remotely controlled lift mechanism.

10. A method as in claim 8 further comprising a grate counterweight so that the lift required to elevate the grate to the operational position is minimized.

11. A method as in claim 10 further comprising a wind catching blade attached along a front side portion of the grate so that discharged air from the aircraft will automatically elevate the grate to an operational position.

12. A method as in claim 8 further comprising a governor/clutch assembly mechanically attached to a shaft of the bladed cylindrical wheel on one end and a secondary flywheel on the other end to limit the speed of the bladed cylindrical wheel when required.

13. A method as in claim 8 further comprising additional jet air recovery generator assemblies spaced along the runway.

* * * * *